UNITED STATES PATENT OFFICE.

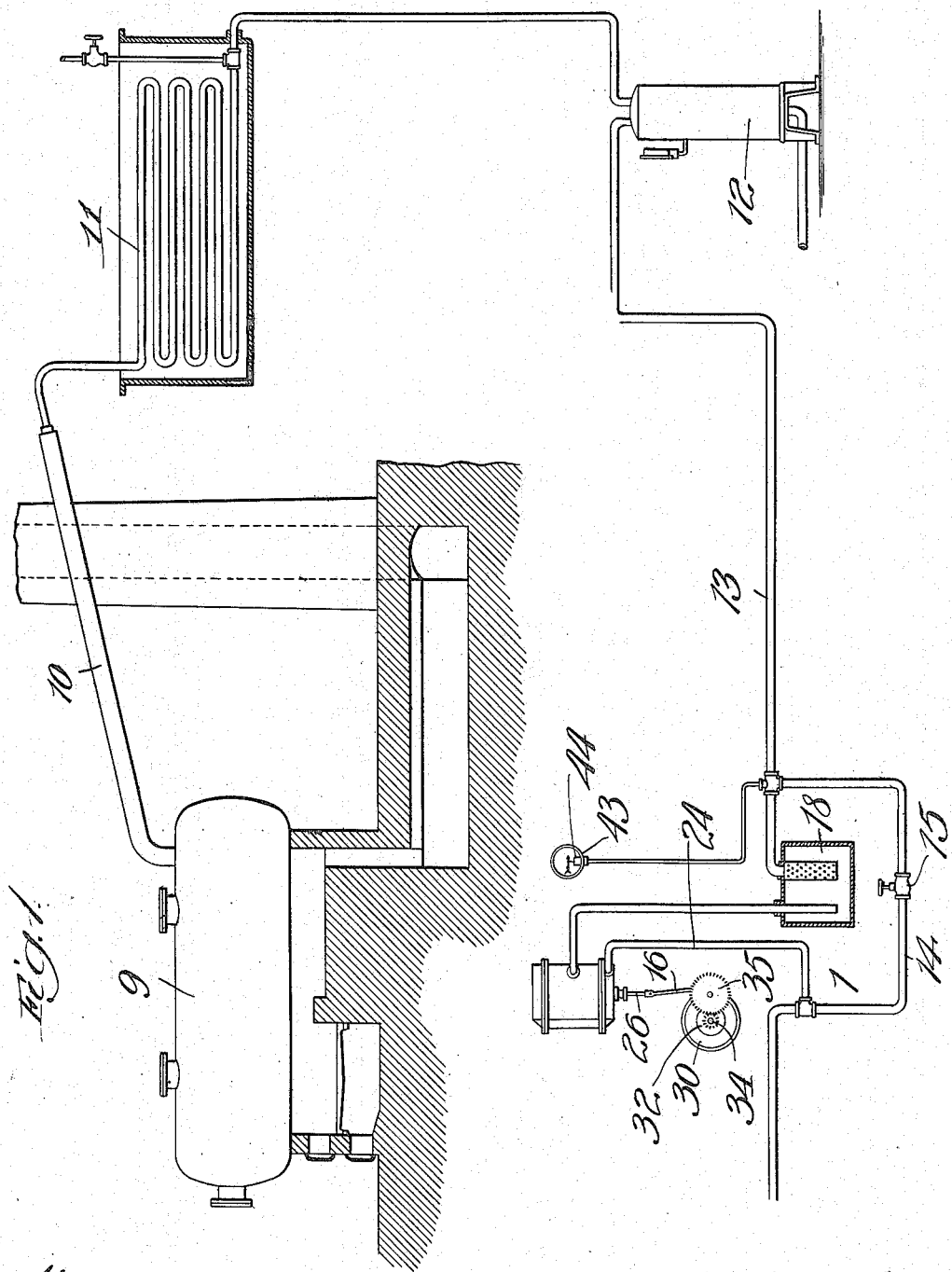

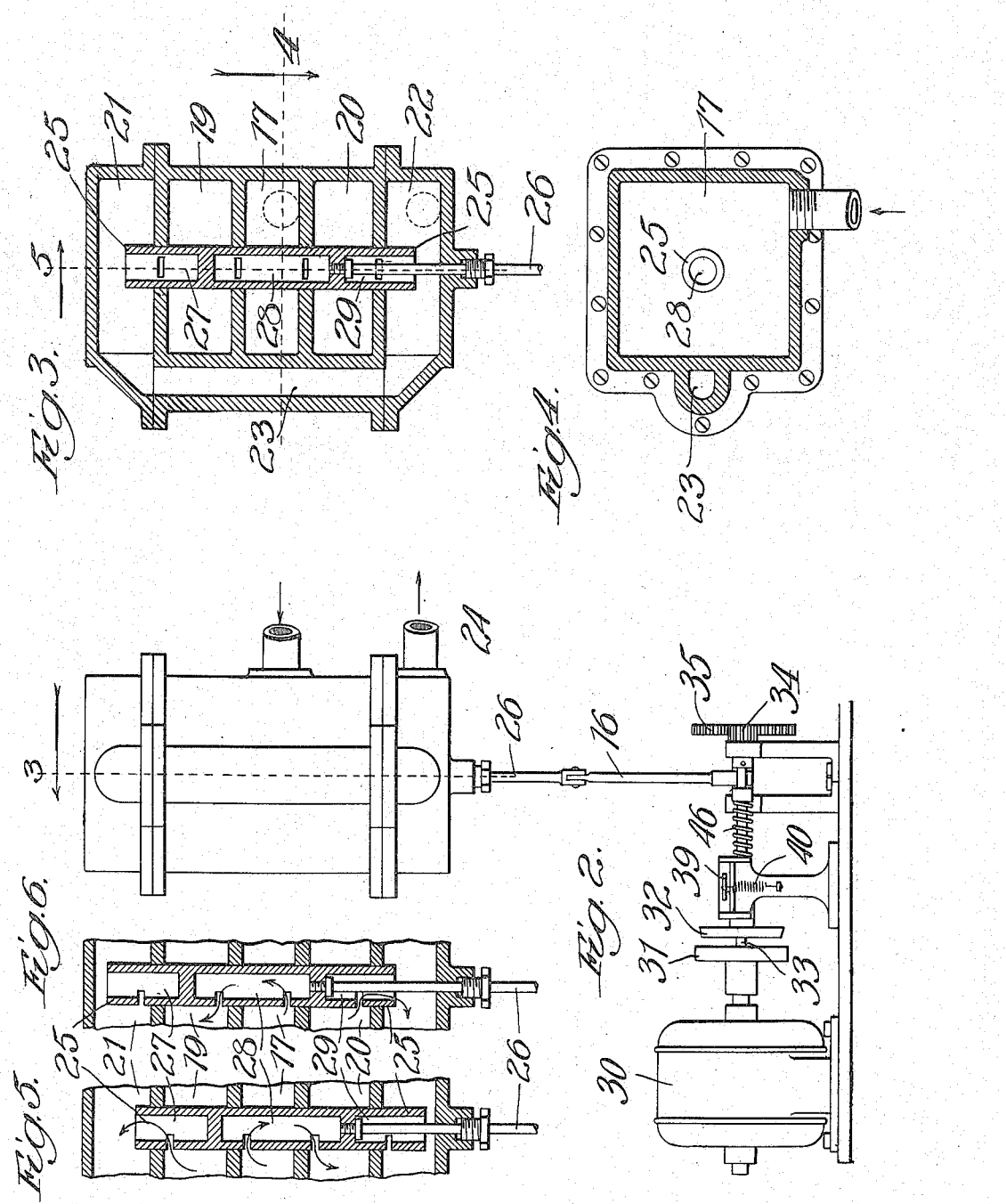

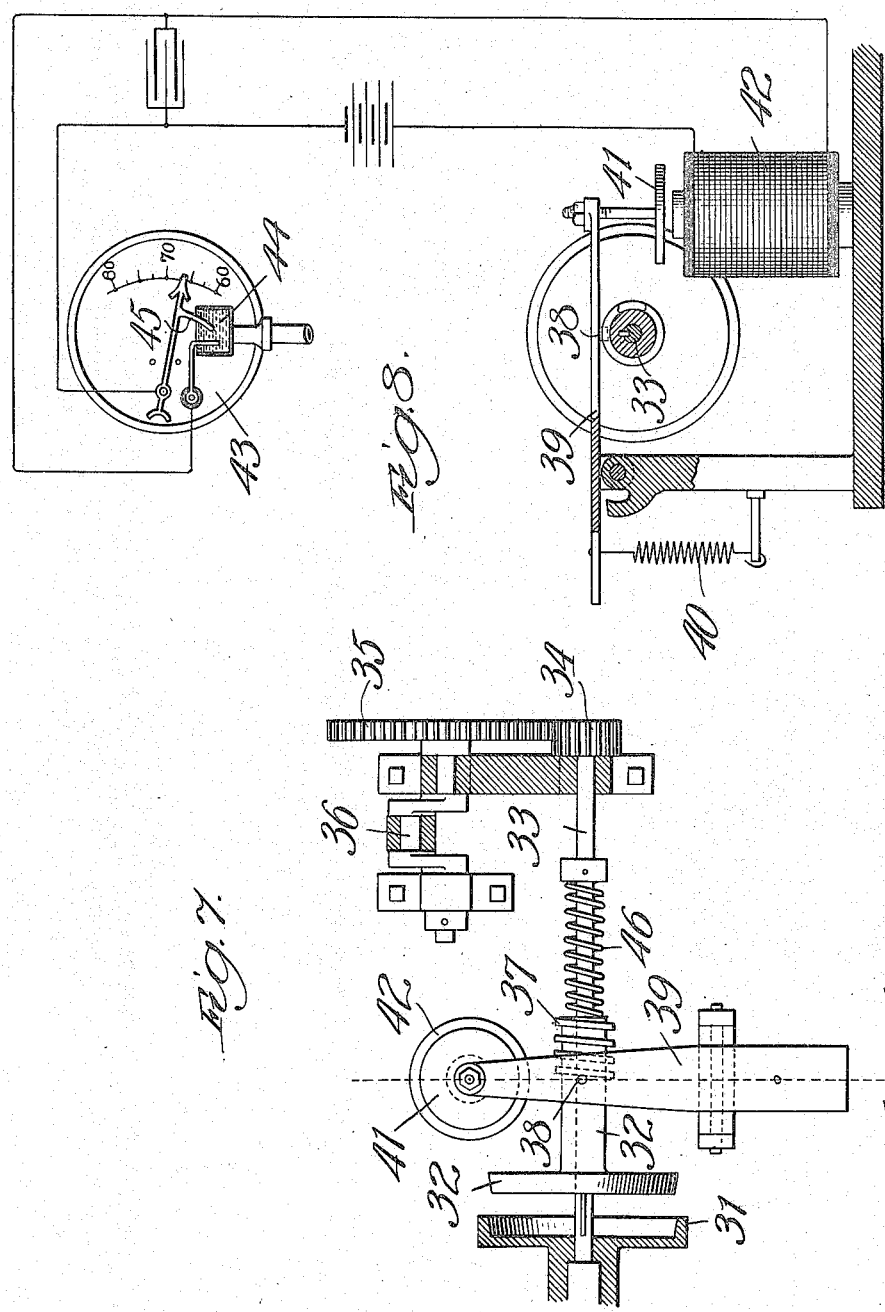

FRANCIS M. ROGERS AND THOMAS S. COOKE, OF WHITING, INDIANA, ASSIGNORS TO STANDARD OIL COMPANY, OF WHITING, INDIANA, A CORPORATION OF INDIANA.

MEANS FOR CONTROLLING STILL-PRESSURE IN GASOLENE MANUFACTURE.

1,122,220.  Specification of Letters Patent.  Patented Dec. 22, 1914.

Application filed August 5, 1914. Serial No. 855,260.

*To all whom it may concern:*

Be it known that we, FRANCIS M. ROGERS and THOMAS S. COOKE, citizens of the United States, residing at Whiting, in the county of Lake and State of Indiana, have invented a new and useful Improvement in Means for Controlling Still-Pressure in Gasolene Manufacture, of which the following is a specification.

This invention relates to certain new and useful improvements in means for controlling still pressure in gasolene manufacture, and is fully described and explained in the specification and shown in the accompanying drawings, in which—

Figure 1 is a diagrammatic view illustrating a system embodying the invention, showing the manner in which it is intended to operate; Fig. 2 is an elevation of the pressure relieving mechanism; Fig. 3 is a vertical section on the line 3 of Fig. 2; Fig. 4 is a horizontal section on the line 4 of Fig. 3; Figs. 5 and 6 are sections on the line 5, Fig. 3, showing the parts in different positions; Fig. 7 is a top plan showing the clutch mechanism; and Fig. 8 is a detail view showing the circuit diagram and certain parts of the clutch arrangement.

It is now understood that in the manufacture of commercial gasolene from high boiling point hydrocarbons, such as the product commonly known in the trade as fuel-oil (which operation is carried on in a pressure still), it is of the utmost importance to maintain perfectly constant and uniform conditions, particularly in matters of pressure, since variations will produce changes in the character of the distillate produced with consequent undesirable irregularities in output. The present device is particularly designed to maintain this pressure absolutely constant, and it has been found thoroughly satisfactory for the purpose.

We have shown in Fig. 1 the system as a whole, so that the relation of the apparatus thereto and its function therein can be readily understood. 9 is a still connected by a conduit 10 with a condenser 11 from which the distillate is led to a receiving drum 12. Pressure is maintained in the system by controllably releasing the non-condensable gases. These are led out from the top of the receiving drum 12 through a pipe 13. The major portion of these gases passes out through a by-pass 14 controlled by a valve 15 to a suitable receptacle, such as a gasometer (not shown). The valve 15 is so set that if it were the only passage through which gas could escape the pressure would rise to a point considerably above that required in the system. In other words, the valve 15 is set so that it will not quite take care of the escape of the gas produced. The remainder of the gas passes through the apparatus and the gas thus handled is relatively small in quantity and therefore the most delicate manipulation is possible. This arrangement, broadly considered, is a point of considerable importance of the invention, that is to say, the principle of providing two passages for the escape of gas, the delicate regulation being performed on a small passage which handles a relatively small proportion of the total volume. The mechanism for performing this delicate regulation being specially designed to that end is also of importance. Its principle of operation will be best understood from Figs. 2 to 6, inclusive. 16 is a pitman which is continuously and rapidly reciprocated in generally vertical direction whenever the system pressure exceeds that selected for the operation therein. The motor mechanism whereby this reciprocation is produced and the means through which it is controlled will presently appear, but immediately it is necessary only to state that it does so operate. Above the pitman is a casing inclosing several chambers. A central chamber 17 receives gas under pressure from the system. For reasons which will presently appear, there is interposed between the central chamber 17 and the pipe 13 a hollow box or expansion chamber 18. Immediately above and below the central chamber 17 are blind chambers 19 and 20, and by blind chambers is meant chambers without outlets. At the top and bottom of the casing are exhaust chambers 21 and 22, connected by a passage 23, and these exhaust chambers are connected by a pipe 24 with a conduit which conducts away released gas to the gasometer. The walls separating the chambers 17, 19, 20, 21 and 22, are centrally perforated to receive a reciprocable piston 25 connected by a piston rod 26 with the pitman 16, so that the operation of the pitman reciprocates the piston 25. The piston is hollow from end to end and provided with two transverse walls dividing it into an upper and middle and a lower part, the upper and lower parts being open at their ends. The side walls of the piston are ported at intervals corresponding to the distance apart of the walls separating the chambers 17, 19, 20, 21 and 22, so that the upper and lower piston chambers have each a single port and the middle chamber two ports.

When the piston is in the position shown in Fig. 3, all the ports are closed and there is no escape of gas. The middle chamber 17 is at the system pressure, the exhaust chambers 21 and 22 at atmospheric or gasometer pressure, and the blind chambers 19 and 20 may have any pressure therebetween, but no flow of gas is taking place. If the piston be depressed, as in Fig. 5, the middle chamber 17 is connected with the blind chamber below it and the blind chamber thus fills with gas at system pressure. Since this pressure will exceed four atmospheres, the volume of gas at atmospheric pressure, which thus enters the chamber, is equivalent to four times the contents of the blind chamber. At the same time the blind chamber above the middle chamber is thrown into communication with the exhaust chamber 21 above it and the excessive gas compressed therein is immediately vented. The movements of gas under these conditions are clearly shown in Fig. 5. When the piston is raised exactly the reverse operation occurs, the upper blind chamber which has just been vented receives gas under pressure from the system and the lower blind chamber which has just been filled with compressed gas is vented. The reciprocation of this piston therefore operates to transfer measured quantities of gas from the high pressure to the low pressure side of the device. Yet at no time is there any large volume of gas in motion or is there any necessity for the delicate adjustment of valves and the like.

For the purpose of reciprocating the pitman 16, a motor 30 is provided, kept in constant rotation. Upon the shaft of this motor is a clutch-member 31 adapted to be engaged by a clutch-member 32 keyed upon a shaft 33. The shaft 33 drives a gear 34 in mesh with the pinion 35 and a crank-shaft 36, which oscillates the pitman 16. The clutch-member 32 is provided on its exterior surface with a spiral thread 37 which may be engaged by a pin 38 on a vertically reciprocable lever 39 normally held up by a spring 40, but which can be drawn down by the armature 41 of an electromagnet 42. The electromagnet is controlled in its operation by a pressure gage 43 containing a mercury contact 44 in which a contact 45 on the needle of the pressure gage may dip when the pressure in the system falls. The result is that when the system pressure is below that desired, the electromagnet will be energized, the pin 38 will fall into the path of the spiral of the clutch-member 32, and the clutch-member 32 will be screwed back out of engagement with its counterpart 31 against the resistance of a clutch-operating spring 46. This will stop the rotation of the shaft 33 and the oscillation of the pitman 16, and the escape of gas, except through the large by-pass, will forthwith cease. The pressure in the system will then gradually rise until the circuit is broken and the magnet armature goes up carrying with it the pin 38 and permitting the spring 46 to set the clutch with an obvious result.

The expansion tank heretofore alluded to, as placed between the main pipe 13 and the present apparatus, is for the purpose of preventing the sudden pulsations due to the reciprocation of the piston 25 from affecting the pressure gage and making its needle jump. With a device as here described installed, the pressure in the system can be maintained constant with the utmost nicety and with no necessity for personal attention.

We realize that considerable variation is possible in the details of the construction herein shown, and we do not intend to limit ourselves thereto, except as pointed out in the following claims, in which it is our intention to claim all the novelty inherent in the device as broadly as is permitted by the state of the art.

We claim as new and desire to secure by Letters Patent—

1. Means for controlling the operating pressure in distillation, comprising a gas-discharge pipe of relatively large capacity but of less capacity than is necessary to maintain the desired pressure, a second gas-discharge pipe of small capacity, and releasing means in said second discharge pipe controlled by the pressure in the system.

2. Means for controlling the operating pressure in distillation, comprising a gas-discharge pipe of relatively large capacity but of less capacity than is necessary to maintain the desired pressure, a second gas-discharge pipe of small capacity, means for releasing the gas from said second discharge pipe in separate measured quantities, and means operated by the pressure in the system for controlling the operation of said releasing means.

3. Means for controlling the operating pressure in distillation, comprising a gas-discharge pipe of relatively large capacity but of less capacity than is necessary to maintain the desired pressure, a second gas-discharge pipe of small capacity, means for releasing the gas from said second discharge pipe in separate measured quantities, and means mechanically operated by the pressure in the system for controlling the operation of said releasing means.

4. In combination a pressure still, a gas pipe leading therefrom, means to discharge gas from said pipe in successive measured charges, and means operated by the pressure in the still to control the discharging means.

5. In combination a pressure still, a gas pipe leading therefrom, a chamber, valve means to alternately connect the chamber with the pipe and to vent the chamber, and means operated by the pressure in the still to control the operation of the valve means.

6. In combination a pressure still, a gas pipe leading therefrom, two chambers, valve means to alternately connect said chambers to said pipe and to vent each while the other is so connected, and means operated by the pressure in the still to control the operation of the valve means.

7. In combination a pressure still, a gas pipe leading therefrom, a chamber, valve means to alternately connect the chamber with the pipe and to vent the chamber, a motor to drive the valve means, and means operated by the pressure in the still to control the effective operation of the motor.

8. In combination a pressure still, a gas pipe leading therefrom, two chambers, valve means to alternately connect said chambers to said pipe and to vent each while the other is so connected, a motor to drive the valve means, and means operated by the pressure in the still to control the effective operation of the motor.

9. In combination a pressure still, a gas pipe leading therefrom, a chamber, valve means to alternately connect the chamber with the pipe and to vent the chamber, a motor to drive the valve means, a clutch between the motor and the valve means, and means controlled by the pressure in the still to set the clutch.

10. In combination a pressure still, a gas pipe leading therefrom, two chambers, valve means to alternately connect said chambers to said pipe and to vent each while the other is so connected, a motor to drive the valve means, a clutch between the motor and the valve means, and means controlled by the pressure in the still to set the clutch.

11. In combination a pressure still, a gas pipe leading therefrom, means to discharge gas from said pipe in successive measured charges, a pressure gage, contacts closed thereby when the predetermined pressure in the system is reached, a magnet in circuit with the contacts, and an armature controlling the discharging means.

12. In combination a pressure still, a gas pipe leading therefrom, a chamber, valve means to alternately connect the chamber with the pipe and to vent the chamber, a pressure gage, contacts closed thereby when the predetermined pressure in the system is reached, a magnet in circuit with the contacts, and an armature controlling the valve means.

13. In combination a pressure still, a gas pipe leading therefrom, two chambers, valve means to alternately connect said chambers to said pipe and to vent each while the other is so connected, a pressure gage, contacts closed thereby when the predetermined pressure in the system is reached, a magnet in circuit with the contacts, and an armature controlling the effective operation of the valve means.

14. In combination a pressure still, a gas pipe leading therefrom, a chamber, valve means to alternately connect the chamber with the pipe and to vent the chamber, a motor to drive the valve means, a pressure gage, contacts closed thereby when the predetermined pressure in the system is reached, a magnet in circuit with the contacts, and an armature controlling the effective operation of the motor.

15. In combination a pressure still, a gas pipe leading therefrom, two chambers, valve means to alternately connect said chambers to said pipe and to vent each while the other is so connected, a motor to drive the valve means, a pressure gage, contacts closed thereby when the predetermined pressure in the system is reached, a magnet in circuit with the contacts, and an armature controlling the effective operation of the motor.

16. In combination a pressure still, a gas pipe leading therefrom, a chamber, valve means to alternately connect the chamber with the pipe and to vent the chamber, a motor to drive the valve means, a clutch between the motor and the valve means, a pressure gage, contacts closed thereby when the predetermined pressure in the system is reached, a magnet in circuit with the contacts and an armature controlling said clutch.

17. In combination a pressure still, a gas pipe leading therefrom, two chambers, valve means to alternately connect said chambers to said pipe and to vent each while the other is so connected, a motor to drive the valve means, a clutch between the motor and the valve means, a pressure gage, contacts closed thereby when the predetermined pressure in the system is reached, a magnet in circuit with the contacts, and an armature controlling said clutch.

18. In combination a pressure still, a gas pipe leading therefrom, means to discharge gas from said pipe in successive measured charges, a pressure gage subjected to the pressure which is to be controlled, means operated by the gage for controlling the operation of the discharging means, and an expansion chamber between the pressure gage and discharging means.

19. In combination a pressure still, a gas pipe leading therefrom, means to discharge gas from said pipe in successive measured charges, a pressure gage subjected to the pressure which is to be controlled, means operated by the gage for controlling the operation of the valve means, and an expansion chamber between the pressure gage and valve means.

In testimony whereof we have hereunto set our hands this 31st day of July, 1914.

FRANCIS M. ROGERS.
THOMAS S. COOKE.

In presence of two subscribing witnesses:
O. C. AVISUS,
A. C. FISCHER.